United States Patent [19]

Bulick

[11] Patent Number: 4,994,701
[45] Date of Patent: * Feb. 19, 1991

[54] BRUSH HOLDER ASSEMBLY

[75] Inventor: John G. Bulick, Dexter, Mich.

[73] Assignee: Ford Motor Company, Dearborn, Mich.

[*] Notice: The portion of the term of this patent subsequent to Sep. 19, 2006 has been disclaimed.

[21] Appl. No.: 372,487

[22] Filed: Jun. 28, 1989

Related U.S. Application Data

[63] Continuation-in-part of Ser. No. 219,688, Jul. 11, 1988, Pat. No. 4,868,441.

[51] Int. Cl.⁵ .......................................... H02K 13/00
[52] U.S. Cl. ...................................... 310/239; 310/42; 310/91; 310/242; 310/247; 310/249
[58] Field of Search ............... 310/239, 240, 241, 242, 310/245, 246, 244, 247, 248, 249, 229, 230, 41, 42

[56] References Cited

U.S. PATENT DOCUMENTS

| | | | |
|---|---|---|---|
| 2,870,354 | 1/1959 | Antonidis | 310/249 |
| 3,025,421 | 3/1962 | Sievert | 310/245 |
| 3,430,084 | 2/1969 | Hall | 310/242 |
| 3,430,915 | 3/1969 | Vogelsberg | 310/245 |
| 3,518,475 | 6/1970 | Sebok | 310/245 |
| 3,983,432 | 9/1976 | Rankin | 310/242 |
| 4,371,803 | 2/1983 | Schindel | 310/242 |
| 4,389,588 | 6/1983 | Rankin | 310/242 |
| 4,673,836 | 6/1987 | Akiyama | 310/239 |
| 4,800,313 | 1/1989 | Warner | 310/242 |
| 4,868,441 | 9/1989 | Bulick | 310/239 |

FOREIGN PATENT DOCUMENTS 3010036 10/1981 Fed. Rep. of Germany ...... 310/242

Primary Examiner—R. Skudy
Attorney, Agent, or Firm—Paul K. Godwin, Jr.; Clifford L. Sadler

[57] ABSTRACT

A brush holder assembly which utilizes an insulated brush card and a bridge means to define a receiving aperture for a brush element. A pair of legs and a connecting element serve to define the bridge means and a constant force spring is retained by the legs so that as the brush is received within the aperture, the spring will partially uncoil and the uncoiled portion of the spring will conform to the profile of the brush. The bridge means also includes a guideway by which the brush is restricted against lateral movement during its use in a motor or generator unit.

8 Claims, 2 Drawing Sheets

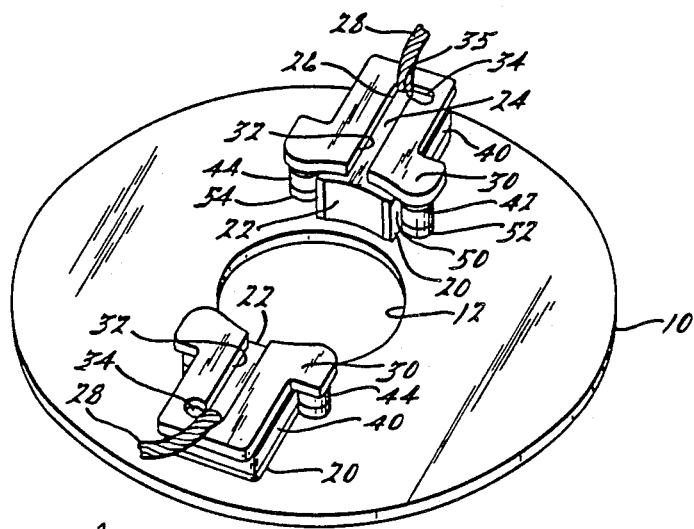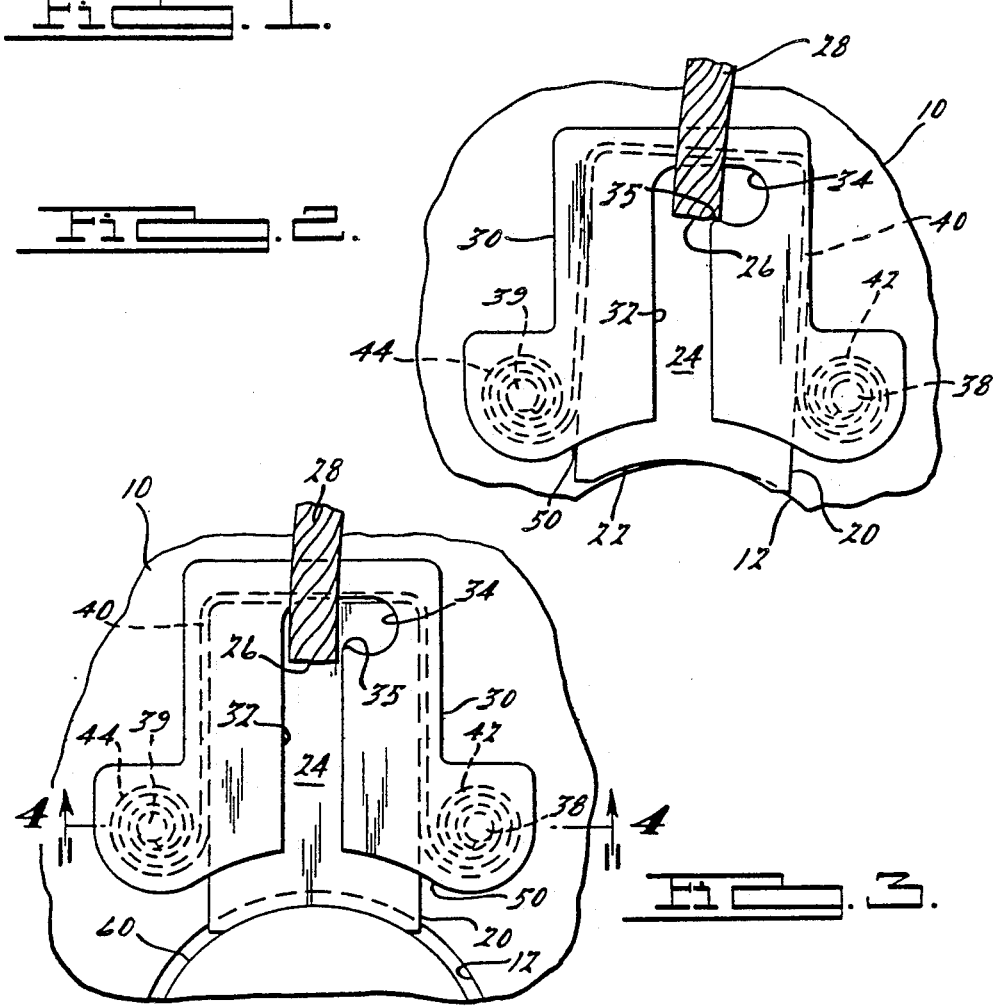

BRUSH HOLDER ASSEMBLY

RELATED APPLICATION

This is a continuation-in-part of Ser. No. 219,688, filed July 11, 1988, now U.S. Pat. No. 4,868,411.

BACKGROUND OF THE INVENTION

1. Field of the Invention

The present invention is directed to the field of electrical machines, such as, motors and generators and more specifically to the area of brush holders that are used to transfer electricity between stationary and rotating elements.

2. Description of the Prior Art

Prior art patents, such as U.S. Pat. Nos. 3,430,084; 3,518,475; 3,983,432; 4,389,588; and 4,371,803, illustrate the use of constant force twin coil springs within prefabricated brush boxes that each provide a guide way for a brush to move against a rotating conductor throughout its wear life. In each case, the brush box is formed with a recess in its forward end to accommodate the twin coils of the constant force spring and with a guide way having its internal dimensions configured to match and accept the brush. In each of the prior references which use the twin coil constant force spring in a brush box configuration, it is apparent that the preassembly of the brush and spring into the brush box prior to installation of the rotating conductor (such as the commutator of a motor) is complicated by the fact the springs and the brushes and springs have a tendency to fly apart, since they are biased to be disassembled in the absence of some type of spacer element positioned between the brushes

SUMMARY OF THE PRESENT INVENTION

It is an object of the present invention to provide a simplified brush holder that provides retaining mechanisms for both the constant force spring and the brush in a fully retracted position prior to assembly into a machine, such as a motor or generator.

It is another object of the present invention to provide a simplified brush holder in which the spring forces that bias the brush against the rotating conductor provide lateral support to retain the brush and also retain the brush holder in a predetermined position on its support means.

It is a further object of the present invention to utilize the brush/wire connection on the brush in conjunction with an elongated slot above the brush to provide a guide for directing the brush towards the rotating commutator and preventing lateral movement thereof.

The above objectives are achieved in the invention disclosed and claimed herein. The invention is intended for use in conjunction with an electric motor or generator in which electricity is to be transferred between a rotating conductor and an electrically conducting brush that is biased to make contact with the rotating conductor. In the case of an electric motor, the rotating conductor is in the form of a commutator having several individual conducting surfaces. In the case of a generator, the rotating conductor may be in the form of a slip ring. For convenience, the following description and pictured embodiment make reference to a commutator as the rotating conductor. However, the invention is equally applicable to any situation where brushes are held biased to make contact with a relatively movable and conducting surface.

A support element, commonly termed a "brush card" is provided as a means for rigidly supporting the brush holder. In a motor, the brush card is located in a position that is adjacent to the location of the commutator. The brush card is preferably an insulator substrate that is rugged enough to withstand the vibrations and temperatures of the motor operation, while maintaining the brush holders in predetermined positions with respect to the rotating commutator. In the preferred embodiment, the brush card contains a pair of apertures with parallel slots for receiving and retaining the legs of each brush holder.

The brush holder is an improvement, as compared to the prior art, since it has a simplified structure and a mechanism for retaining the brush within the holder. A bridge element is formed by a pair of legs and a connecting element. One end of each leg is attachable to the brush card and the connecting element is rigidly attached between the other ends of the legs. The combination of the bridge means and the adjacent surface of the brush card defines an aperture into which the brush element may be received.

Spring means extend between the legs and are used for biasing the brush element received in the aperture in a manner that forces the brush towards the rotating commutator. A twin helical coil constant force spring is shown as the preferred spring means with the legs of the bridge means extending through each of the helical coils.

BRIEF DESCRIPTION OF THE DRAWINGS

FIG. 1 is a perspective view of a pair of brush holders of the present invention shown in the absence of a rotating commutator.

FIG. 2 is top plan view of a brush holder of the present invention shown in its latched position prior to assembly into a motor.

FIG. 3 is a top plan view of the brush holder of the present invention shown in its unlatched position with the brush element biased against the rotating conducting means.

DETAILED DESCRIPTION OF THE PREFERRED EMBODIMENT

Figure 4:
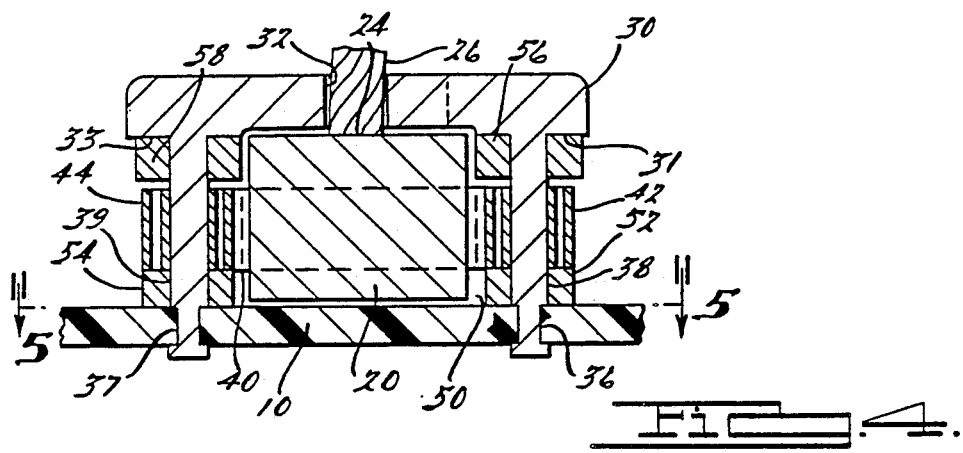
FIG. 4 is a cross-sectional view of the brush holder illustrated in FIG. 3, taken along line 4—4.

In FIG. 1, a pair of brush holders of the present invention are illustrated. The brush holders are shown mounted onto a brush card substrate 10 and opposing each other across a central aperture 12. The central aperture 12 is formed to be larger than a rotating conducting element (commutator 60 in FIG. 3) that is used in the assembled motor. In each brush holder, a carbon brush 20 is positioned and biased with a constant force spring 40 so as to make contact with the rotating commutator 60. Contact with that element is made through the concave shaped front surface 22. A lead wire 28 extends from the upper surface 24 of the brush 20. The connection 26 of lead wire 28 may be performed during the process of molding the brush.

By referring to FIGS. 1 and 4, it can be seen that a connecting plate element 30 and a pair of legs 38 and 39 extending therefrom are connected to the brush card substrate 10. The connecting plate element 30, along with the legs 38 and 39 serve to form a bridge over the brush element 20 and define an aperture 50 into which the brush is to be received during assembly and retained during use.

In FIGS. 1, 2, 3, 4 and 6, the connecting plate element 30, preferably formed of an insulating material, is shown as containing a guide-way slot 32. The guide-way slot 32 is open at the forward end (defined as being adjacent the aperture 50), so as to receive the lead wire 28 extending from the top surface 24 of the brush 20 during assembly, and to provide a guide to subsequent movement of the brush as it wears during its life within the brush holder. The guide-way 32 is a slot which defines a pair of spaced-apart, parallel sidewalls that allow for passage of the lead wire 28 and restrict the lateral movement of the brush 20 during operation of the motor. The sidewalls of the guideway 32 interfere with any corresponding lateral movement of the lead wire 28 extending from the top of the brush 20. At the opposite and closed end of the guide-way 32, is an offset aperture 34 and a retaining point 35. The retaining point 35 and the offset aperture 34 serve to provide sufficient clearance for latching the brush in a retracted position prior to assembly in the motor.

The constant force spring 40 includes twin helical coils 42 and 44 separated by an uncoiled flat portion 46. The coils 42 and 44 are mounted so as to encircle respective legs 38 and 39 with sufficient clearance to minimize friction therebetween.

Figure 5:
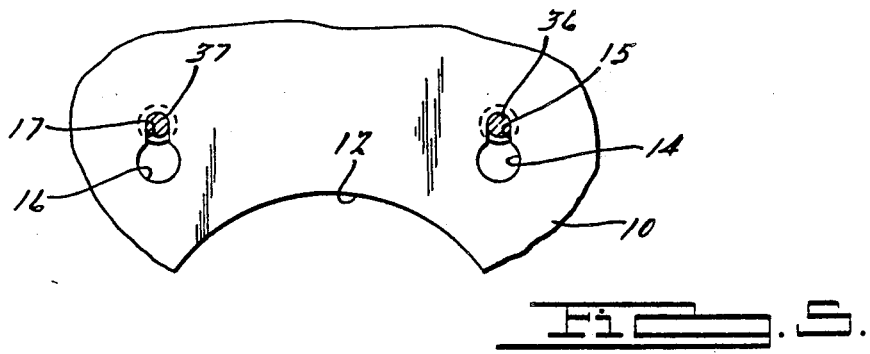
FIG. 5 is a cross-sectional view of the brush holder illustrated in FIG. 4, taken along line 5—5.

In FIG. 5, the brush card substrate 10 is shown as containing a pair of apertures 14 and 16 for each brush holder location. The apertures 14 and 16 are large enough to receive the ends of legs 38 and 39, respectively. The apertures 14 and 16 respectively contain slots 15 and 17 that extend away from the major aperture 12 and are of a size that will correspondingly receive and retain indented portions 36 and 37 of legs 38 and 39.

Figure 6:
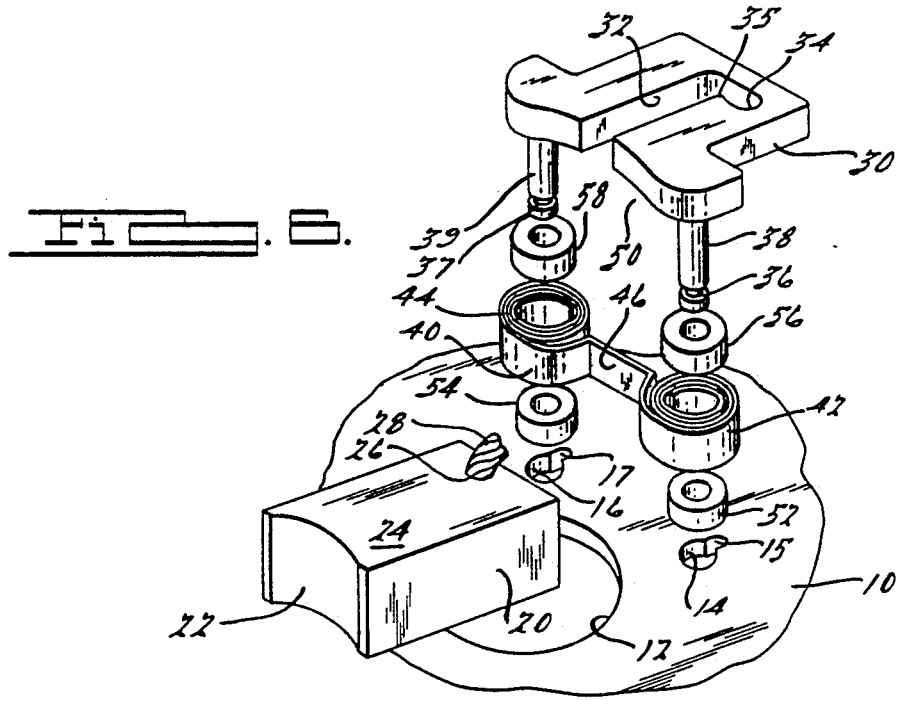
FIG. 6 is an exploded view that separately illustrates the elements shown in previous FIGS. 1-5.

From FIG. 6, it can be seen that during initial assembly of the brush holder onto the brush card 10, spacers 56 and 58 and the spring coils 42 and 44 are slipped over the legs 38 and 39. The spacers 56 and 58 are positioned beneath and adjacent the lower surfaces 31 and 33 of the plate element 30 surrounding the respective legs 38 and 39. Spacers 56 and 58 serve to limit the upward location of the spring coils and center the flat portion 46 of the spring 40 with respect to the height dimension of the brush 20. Subsequently, spacers 52 and 54 are positioned beneath the spring coils 42 and 44. Spacers 52 and 54 are mounted on legs 38 and 39, beneath the respective coils 42 and 44 so as to elevate the spring 40 with respect to the surface of the brush card 10. The ends of legs 38 and 39 are inserted into the apertures 14 and 16 and the indented portions 36 and 37 are respectively slipped into slots 15 and 17 for frictional retention. (Of course, conventional attachment techniques may be substituted in order to connect the legs to the brush card, depending upon the nature of assembly process employed in fabricating the motor or generator units.)

The brush 20 is inserted into the defined aperture 50 so that its lead wire 28 enters the guide-way slot 32. This insertion mates the rear of the brush 20 with the uncoiled flat portion 46 of the spring 40 and the coils 42 and 46 partially unwind from around the legs as insertion continues. Against the force of the spring 40, the brush 20 is received within the aperture 50 until the lead wire connection 26 is near the rear of the guide-way slot 32. At that point, the brush 20 may be latched into its fully retracted position against the force of the spring 40 by displacing the rear of the brush 20 until the lead wire connection 26 enters the offset aperture 34 and is caught by retaining point 35, as shown in FIG. 2. The force of the spring 40 causes the connection 26 and the brush 20 to be retained in a manner which allows for the brush to be installed in the assembly prior its incorporation in the motor.

During the build up of the motor and as shown in FIG. 3, the commutator 60 is inserted into the aperture 12 and the brush is subsequently released from its latched position so that it is biased by the spring 40 against the conducting surfaces of the commutator 60 for the remainder of its wear life. If subsequent repair of the motor is necessary, the brushes may be again latched in their retracted positions so that they will not become inadvertently disassembled when the commutator is removed.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A brush holder for use in a machine in which electricity is to be transferred between a rotatable conductor and an electrically conducting brush element with an electrical wire extending therefrom and biased to make contact with said rotatable conductor, comprising:

means positioned adjacent the location of said rotatable conductor for rigidly supporting said brush holder;

bridge means formed with a pair of legs having one end of each leg connected to said supporting means and with a connecting element rigidly attached to the opposite ends of said legs, wherein said bridge means along with said supporting means define an aperture to receive an electrically conducting brush element;

spring means extending between said legs for biasing said brush element received in said aperture towards said rotatable conductor; and said connecting element includes means for both restricting the lateral movement of said brush element by interfering with the corresponding lateral movement of said electrical wire extending from said brush element and simultaneously guiding said brush element in a predetermined path during operation.

2. A brush holder as in claim 1, wherein said spring means comprises a single strip of resilient metal formed to have helical coils formed at each end separated by a uncoiled section.

3. A brush holder as in claim 2, wherein said coils of said spring means are positioned to surround a portion of each leg and said uncoiled section extends across said aperture.

4. A brush holder as in claim 3, wherein said uncoiled section of said spring means contacts said brush element and said coils are partially unwound when said brush element is received within said aperture and provides a constant bias force of said brush element against said rotatable conductor.

5. A brush holder as in claim 1, wherein said restricting and guiding means is a slot defining a pair of parallel sidewalls spaced apart a sufficient distance to allow the wire extending from the brush element to pass through the slot.

6. A brush holder as in claim 5, wherein said spring means comprises a single strip of resilient metal formed to have helical coils formed at each end separated by an uncoiled section.

7. A brush holder as in claim 6, wherein said coils of said spring means are positioned to surround a portion of each leg and said uncoiled section extends across said aperture.

8. A brush holder as in claim 7, wherein said uncoiled section of said spring means contacts said brush element and said coils are partially unwound when said brush element is received within said aperture and provides a constant bias force of said brush element against said rotatable conductor.

* * * * *